(12) United States Patent
Nagamatsu et al.

(10) Patent No.: US 7,228,294 B2
(45) Date of Patent: Jun. 5, 2007

(54) ELECTRONIC CAM DEVICE AND METHOD OF PREPARING CAM DATA IN ELECTRONIC CAM DEVICE

(75) Inventors: Ikuo Nagamatsu, Fukuoka (JP); Shigenori Ohkubo, Osaka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 473 days.

(21) Appl. No.: 10/399,474

(22) PCT Filed: Oct. 18, 2001

(86) PCT No.: PCT/JP01/09169

§ 371 (c)(1),
(2), (4) Date: Sep. 25, 2003

(87) PCT Pub. No.: WO02/33599

PCT Pub. Date: Apr. 25, 2002

(65) Prior Publication Data

US 2004/0049302 A1  Mar. 11, 2004

(30) Foreign Application Priority Data

Oct. 19, 2000 (JP) ............................. 2000-319319

(51) Int. Cl.
*G06F 15/18* (2006.01)
(52) U.S. Cl. .................... 706/14; 706/12; 706/46
(58) Field of Classification Search ............... 706/14, 706/12, 46; 83/53; 318/569
See application file for complete search history.

(56) References Cited

U.S. PATENT DOCUMENTS

| | | | | |
|---|---|---|---|---|
| 5,636,558 A | * | 6/1997 | Sanders et al. ............... 83/53 |
| 6,006,637 A | * | 12/1999 | Sanders et al. ............... 83/53 |
| 6,101,912 A | * | 8/2000 | Sanders et al. ............... 83/53 |
| 6,781,339 B1 | * | 8/2004 | Ikeguchi ..................... 318/569 |
| 2001/0040492 A1 | * | 11/2001 | Hyatt et al. .................. 335/258 |
| 2003/0079587 A1 | * | 5/2003 | Cote et al. ..................... 83/13 |
| 2003/0079591 A1 | * | 5/2003 | Cote et al. .................... 83/161 |

FOREIGN PATENT DOCUMENTS

JP  10-328899  12/1998

OTHER PUBLICATIONS

Allen Bradley, Electronic Cam and Mechanical Cam with 1394 Motion Control, 2000, AB, 1,2.*
Parker, Digivex Motion and cam functions: New advanced possibilities, Parker, 1, 2, 3.*
B. Demeulenaere, Dynamically Compensated Cams for Rigid Cam-Foller Systems with Fluctuating Cam Speed and Dominating Inertial Forces, 2001, IEEE, 763-768.*

* cited by examiner

*Primary Examiner*—Joseph P Hirl
(74) *Attorney, Agent, or Firm*—Sughrue Mion, PLLC (57) ABSTRACT

A method of automatically generating the cam data capable of realizing such a smooth cam profile that an acceleration at a designated point is zero without necessitating a special technique, comprising the steps of first obtaining an inclination at each designated point when an optimum cam profile is realized for each designated point by an automatic set value generating section (15), automatically obtaining, by using the inclination value and a preset equation, such a cam profile that the acceleration at the designated point is zero for each district between two designated start and endpoints, and lastly obtaining an entire cam profile by synthesizing the cam profiles obtained for each district.

4 Claims, 10 Drawing Sheets

ELECTRONIC CAM DEVICE AND METHOD OF PREPARING CAM DATA IN ELECTRONIC CAM DEVICE

BACKGROUND OF THE INVENTION

Technical Field

The present invention relates to an electronic cam device for electrically achieving a cam motion by driving an object to be driven on the basis of preset cam data, and in particular, a method of generating a cam profile that generates cam data to achieve a smooth cam profile that an acceleration becomes zero at a given designated point.

In prior arts, a mechanical cam has been used for many years as means for converting rotating motions of a main shaft, which is driven by a motor, etc., into cyclic linear motions of a driven shaft. However, if a profile of one cam is determined in a case of a mechanical cam, only one cyclic cam profile (displacement curve) can be obtained. Therefore, since mechanical cams of different profiles to realize different cam profiles are manufactured in order to obtain the different cam profiles, and the mechanical cams are changed, considerable time for set-up time is required for manufacture, replacement and adjustment. Recently, an electronic cam device is used as means for reducing such troublesome work, which can directly drive a driven shaft being an object to be controlled, by a servomotor on the basis of preset cam data. The electronic cam device stores displacement data of cam profiles in a memory portion in advance, and the servomotor is driven and controlled on the basis of instructions from the memory portion, wherein the driven shaft may be displaced in compliance with desired cam profiles. According to such an electronic cam device, since it can respond to a different cam profile if the displacement data of cam profiles in the memory portion are replaced, designing time thereof can be shortened in comparison with a mechanical cam device.

Figure 14:
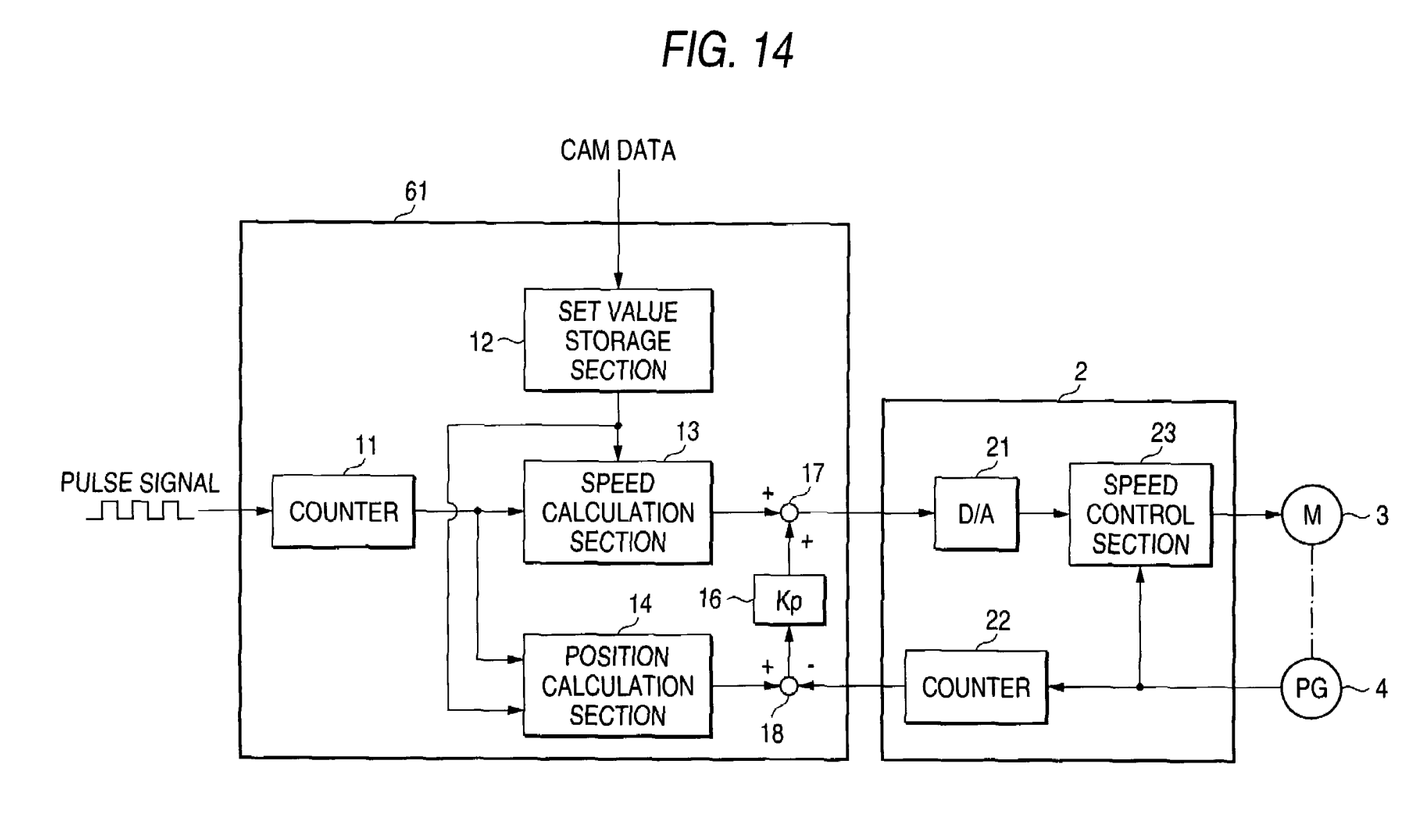
FIG. 14 is a block diagram showing a construction of a prior art electronic cam device.

A construction of such a prior art electronic cam device is shown in FIG. 14. Referring to FIG. 14, the prior art electronic cam device is composed of a controller 61, a servo driver 2 for carrying out speed control of a motor 3 upon receiving speed instructions from the controller 61, a motor 3, and a pulse generator (PG) 4.

Pulse signals corresponding to phases of a mechanical cam device are inputted into the controller 61, and the controller 61 outputs speed instructions to the servo driver 2 in response to the number of pulses of the pulse signals. Also, the controller 61 is composed of a counter 11, a set value storage section 12, a speed calculation section 13, a position calculation section 14, a position control gain multiplier 16, an adder 17 and a subtracter 18.

The counter 11 counts the number of pulses of inputted pulse signals. The set value storage section 12 stores cam data to realize cam profiles.

The speed calculation section 13 obtains the present phase on the basis of a count value of the counter 11, reads a displacement amount responsive to the phase from the cam data stored in the set value storage section 12, and calculates and outputs a speed instruction based on the displacement amount.

The position calculation section 14 obtains the present phase on the basis of a count value of the counter 11, reads a displacement amount responsive to the phase from the cam data stored in the set value storage section 12, and calculates and outputs a position instruction based on the displacement amount. The subtracter 18 subtracts position data counted by the counter 22 from the position instruction coming from the position calculation section 14 and outputs the same as a position error.

The position control gain multiplier 16 multiplies the position error, which is obtained by the subtracter 18, by a position control gain Kp, and outputs the same. The adder 17 adds value coming from the position control gain multiplier 16 to the speed instruction coming from the speed calculation section 13, and outputs the same to the servo driver 2 as a new speed instruction.

Also, the servo driver 2 is composed of a D/A converter 21, a counter 22, and a speed control section 23.

The D/A converter 21 converts the speed instruction from the controller 61 to analog signals and outputs the same. The counter 22 calculates position data, which expresses the position of the motor 3, by counting the number of pulse signals from the pulse generator 4. The speed control section 23 carries out speed control of the motor 3 on the basis of speed instructions of analog signals from the D/A converter 21.

Next, a description is given of actions of the prior art electronic cam device. First, cam data established by setting means (not illustrated) are stored in the set value storage section 12 of the controller 61. A start instruction of a cam action (not illustrated) is transmitted to the speed calculation section 13 and position calculation section 14 via the counter 11, wherein a speed instruction and a position instruction subject to the cam data stored in the set value storage section 12 are outputted to the servo driver 2. And, the speed of the motor 3 is controlled by the servo driver 2 on the basis of the speed instruction and position instruction.

Figure 15:
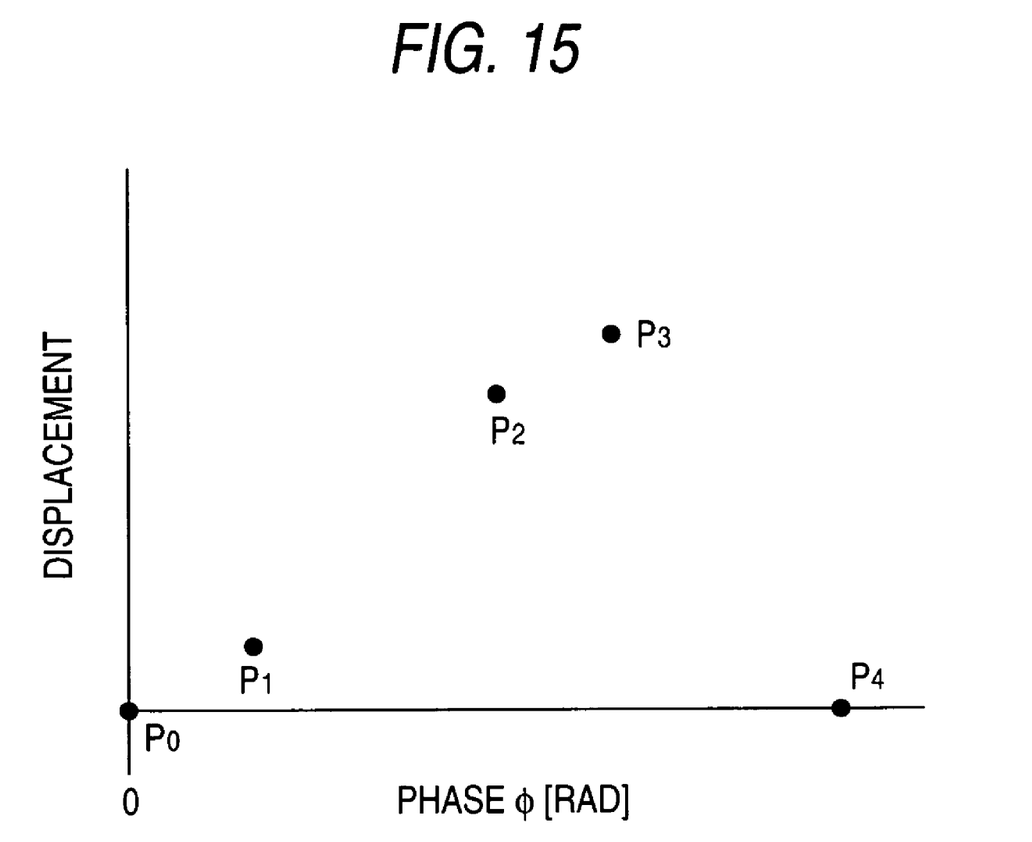
FIG. 15 is a view describing a method for generating cam data according to the prior art electronic cam device.

In the prior art electronic cam device, it is necessary to generate cam data, which are established in the set value storage section 12, in advance. In detail, as shown in FIG. 15, where displacement is pointed out at respective designated points $P_0$, $P_1$, $P_2$, $P_3$, $P_4$, which are caused to correspond to the phase of the cam, a cam profile by which the respective designated points are connected to each other is designed by a straight or curved line. And, data to realize the obtained cam profile are generated and established in the set value storage section 12, wherein a cam motion is achieved on the basis of the designed cam profile.

With regard to the cam data shown in FIG. 15, an ordinate indicates a dimensionless value corresponding to a target value of the displacement that is obtained by operating the electric cam device shown in FIG. 14, and an abscissa indicates a dimensionless value corresponding to a target value of the phase that is also obtained by operating the electric cam device shown in FIG. 14.

In order to secure a cam profile that is able to suppress a shock, which is applied to a machine at the respective points, to the minimum, it is necessary to generate a cam profile for which an acceleration becomes zero at respective designated points. However, in order to design a smooth cam profile which connects the designated points and for which the acceleration becomes zero at respective designated points, a technique of a mechanical cam mechanism is needed, wherein a smooth cam profile cannot be easily obtained by the unskilled.

Also, in the prior art electronic cam device described above, it is necessary that cam data to realize a smooth cam profile passing through respective given designated points at an acceleration of zero are generated in advance, wherein, since expert knowledge of cam profile technology is required, there is a problem by which it is impossible to set cam data by anyone other than specified engineers.

SUMMARY OF THE INVENTION

It is therefore an object of the invention to provide an electronic cam device, which is able to automatically generate cam data to realize, without requiring any special technique, a smooth cam profile that an acceleration is zero at a designated point, and a method for generating cam data in the electronic cam device.

In order to achieve the above-described object, a method for generating cam data in an electronic cam device according to the present invention, which controls the electronic cam device for electrically realizing cam actions by driving an object to be driven, on the basis of preset cam data, comprising the steps of:

inputting coordinate values composed of phases of a plurality of designated points and displacement thereof;

calculating inclinations of the start and end points of a cam profile corresponding to a district between two designated start and end points adjacent to each other of a plurality of given designated points;

obtaining values of $\tan\beta_0$ and $\tan\beta_1$ by an equation which is expressed by the above calculated inclinations of the start and end points, $\Delta x$ which is a difference in phase between the start and end points, and $\tan\beta_0$=Inclination at the start point×$\Delta x/\pi$
$\tan\beta_1$=Inclination at the end point×$\Delta x/\pi$ calculating a cam profile in the corresponding district by obtaining a value of displacement y with respect to the phase $\Phi$ using an equation which is expressed by the above-described $\tan\beta_0$, $\tan\beta_1$, and $\Delta y$ which is a difference between displacement at the start point and at the end point, and $$y=A(\Phi-1/2\sin 2\Phi)+\Phi\tan\beta_0+1/2(\tan\beta_1-\tan\beta_0)(\Phi-\sin\Phi)$$

wherein coefficient A is defined as $$A=\Delta y/\pi-1/2(\tan\beta_1-\tan\beta_0)$$

and generating the entire cam curve by calculating and synthesizing a cam profile existing between the two corresponding points with respect to all districts.

Further, the step of calculating the inclinations at the start point and end point of a cam profile of a district for which two designated points adjacent to each other of the above-described plurality of given designated points are made into the start point and end point may calculate the inclination a the above-described start point in compliance with the following steps:

(a) in a case where the present district is a straight line, the inclination ($\Delta y/\Delta x$) of the present district is made into an inclination at the start point, thereby finishing the calculation of the inclination;

(b) in a case where the present district is the top district, the final district is made into the foregoing district;

(c) in a case where the foregoing district is a straight line, the inclination of a straight line of the foregoing district is made into an inclination at the start point, thereby finishing the calculation of the inclination;

(d) in a case where the polarities of the inclinations at the entire foregoing districts are different from that of the inclination at the entire present district, the inclination at the start point is regarded as zero, thereby finishing the calculation of the inclination; and (e) the average of an inclination when the present district is linearly approximated and an inclination when the foregoing district is linearly approximated is made into the inclination at the start point; and the above-described step may calculate an inclination at the above-described end point in compliance with the following steps;

(A) in a case where the present district is a straight line, the inclination ($\Delta y/\Delta x$) of the present district is made into an inclination at the end point, thereby finishing the calculation of the inclination;

(B) in a case where the present district is the final district, the top district is made into the succeeding district;

(C) in a case where the succeeding district is a straight line, the inclination of a straight line of the succeeding district is made into an inclination at the end point, thereby finishing the calculation of the inclination;

(D) in a case where the polarities of the inclinations of the entire succeeding districts are different from that of the inclination of the entire present district, the inclination at the end point is regarded as zero, thereby finishing the calculation of the inclination; and (E) the average of an inclination when the present district is linearly approximated and an inclination when the succeeding district is linearly approximated is made into the inclination at the end point.

According to the invention, since it is possible to automatically calculate, on the basis of coordinate values of given designated point, a smooth cam profile that passes through respective designated points by a smooth curve and the accelerations at the respective designated points become zero, a smooth cam profile can be easily realized without requiring any special technique.

As described above, according to the invention, it is possible for even unskilled persons to produce cam data that does not bring about any shock to a machine, without acquiring a cam technique of a mechanical cam mechanism, wherein such an effect can be brought about, which can shorten the designing time to a large extent.

DETAILED DESCRIPTION OF THE EMBODIMENTS

Next, a detailed description is given of an embodiment of the invention with reference to the accompanying drawings.

Figure 1:
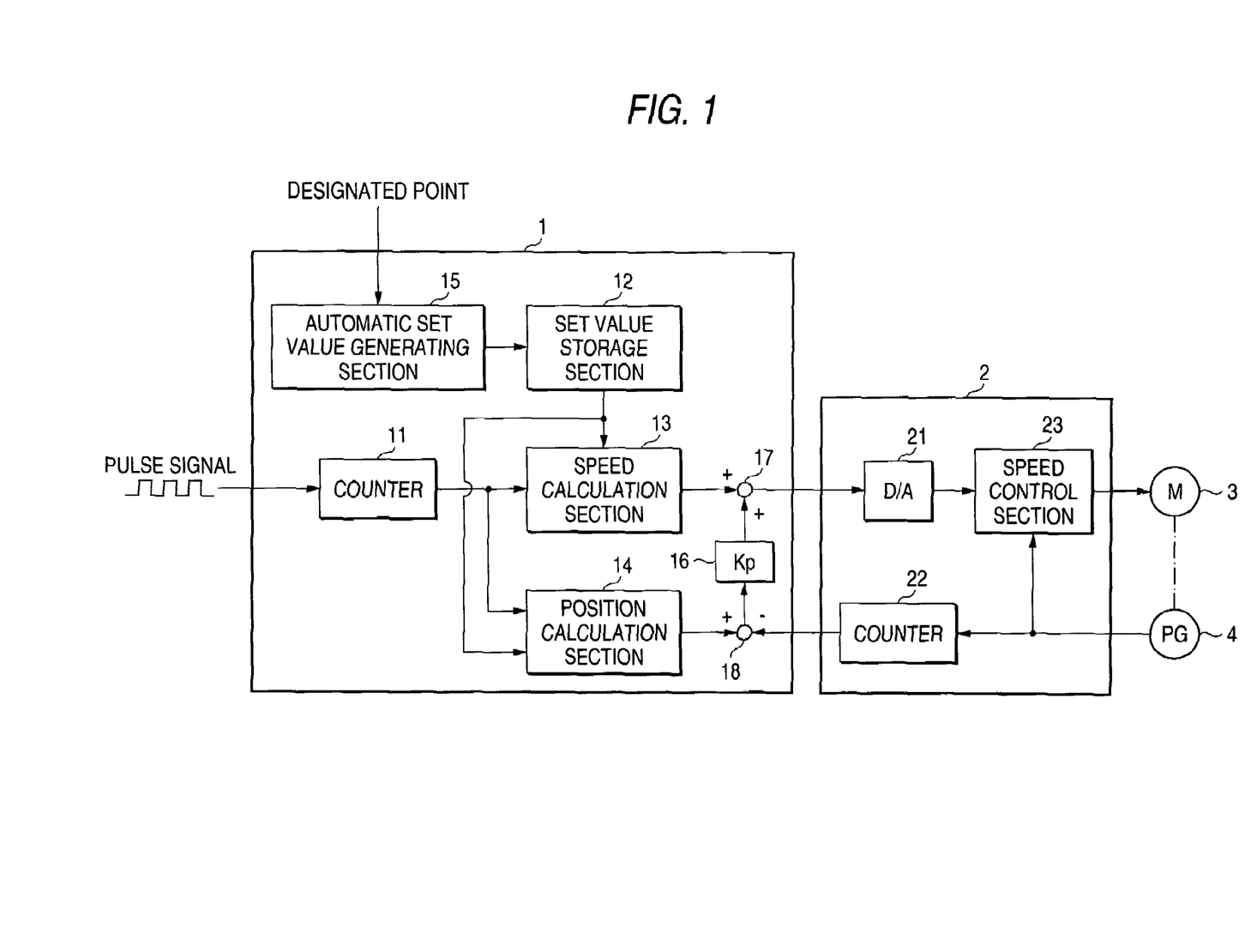
FIG. 1 is a block diagram showing a construction of an electronic cam device according to one embodiment of the invention.

FIG. 1 is a block diagram showing a construction of an electronic cam device according to one embodiment of the invention. In FIG. 1, components which are the same as those in FIG. 14 are given the same reference number, and overlapping description thereof is omitted.

An electronic cam device according to the present embodiment is such that the controller 61 in the prior art electronic cam device is substituted by the controller 1, And, the controller 1 is different from the controller 61 in that an automatic generating section 15 of set values, which is able to automatically generate cam data to realize a smooth cam profile on the basis of given designated points, is newly added to the controller 61 shown in FIG. 14.

Set values generated by the set value generating section 15 are stored in the set value storage section 12. Since subsequent processes are similar to those carried out by the prior art electronic cam device shown in FIG. 14, description thereof is omitted.

The cam data that is dealt within the set value generating section 15 and the set value storage section 12 is all dimensionless value. More specifically, displacements x, y, X and Y (which will be used in explanations for FIGS. 2, 4 and 6 to 13) are cam data having dimensionless values which correspond to respective displacements obtained by operating the electric cam device. Similarly, $\Phi$ and $\pi$ correspond to phases and are also dimensionless values when expressing cam data. Y', U' and V' are also dimensionless values which correspond to speeds.

Next, a detailed description is given of a method for automatically generating cam data by the set value automatic generating section 15 of an electronic cam device according to the embodiment with reference to the drawings.

In the method for generating cam data in the electronic cam device according to the embodiment, inclinations at respective designated points when an optimum cam profile is realized are obtained for the respective designated points. And, cam curves are obtained at respective districts, for which two designated points are made into the start point and end point, by using the inclination values and the following equations (1), (2), (3) and (4), and the entire cam profile is obtained by synthesizing cam curves obtained for the respective districts:

$$y = A(\Phi - 1/2\sin 2\Phi) + \Phi\tan\beta_0 + 1/2(\tan\beta_1 - \tan\beta_0)(\Phi - \sin\Phi) \quad (1)$$

where A in equation (1) is expressed by the following equation (2).

$$A = \Delta y/\pi - 1/2(\tan\beta_1 - \tan\beta_0) \quad (2)$$

And, $\tan\beta_0$ and $\tan\beta_1$ in the equations (1) and (2) are, respectively, expressed by equations (3) and (4). $\Delta x/\pi$ is a coefficient for scaling each district to a district of 0 to $\pi$. $\Delta x$ is a difference in the x coordinate between two designated points, and $\Delta y$ is a difference in the y coordinate between two designated points.

$$\tan\beta_0 = y/\Phi = \text{Inclination at the start point} \times \Delta x/\pi \quad (3)$$

$$\tan\beta_1 = y/\Phi = \text{Inclination at the end point} \times \Delta x/\pi \quad (4)$$

The above-described equation (3) can be obtained by substituting $\Phi = x \times \pi/\Delta x$ in $\tan\beta_0 = y/\Phi$. The reason $\Phi = x \times \pi/\Delta x$ is obtained is as shown below. Although, in FIG. 2, smooth curves are generated in districts 0 through $\pi$, an actual difference in phase between the two designated points does not necessarily become $\pi$. Therefore, in order to scale curves generated in the districts from 0 through $\pi$ to the actual difference in phase between two designated points, $\Phi = x \times \pi/\Delta x$ is assumed.

Figure 2:
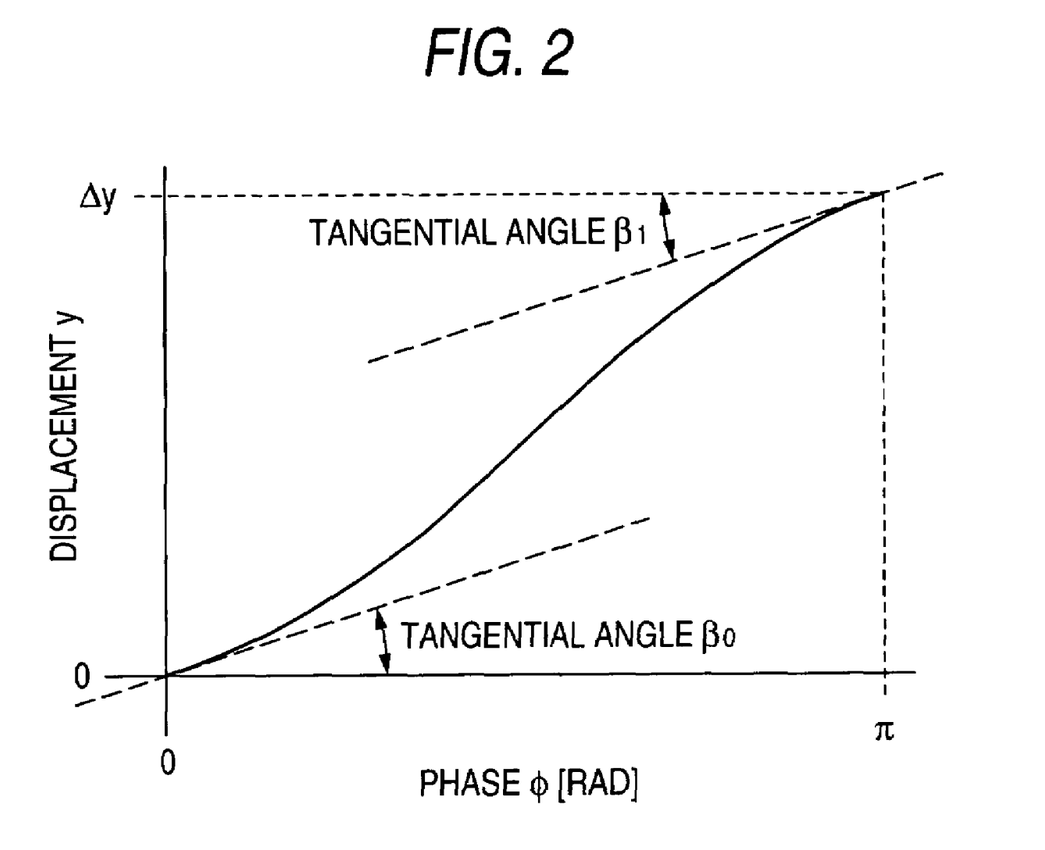
FIG. 2 is a view illustrating a cam profile which describes a method for calculating an inclination at the start point and an inclination at the end point in an electronic cam device according to one embodiment of the invention.

At this time, a method for calculating the inclination at the start point and that at the end point is described with reference to FIG. 2. In order that the final data obtained by synthesizing cam curves obtained at respective districts becomes a smooth profile (curve), it is indispensable that the final speed (inclination) of the cam profile of the foregoing district is coincident with the initial speed (inclination) of the succeeding district.

Figure 3:
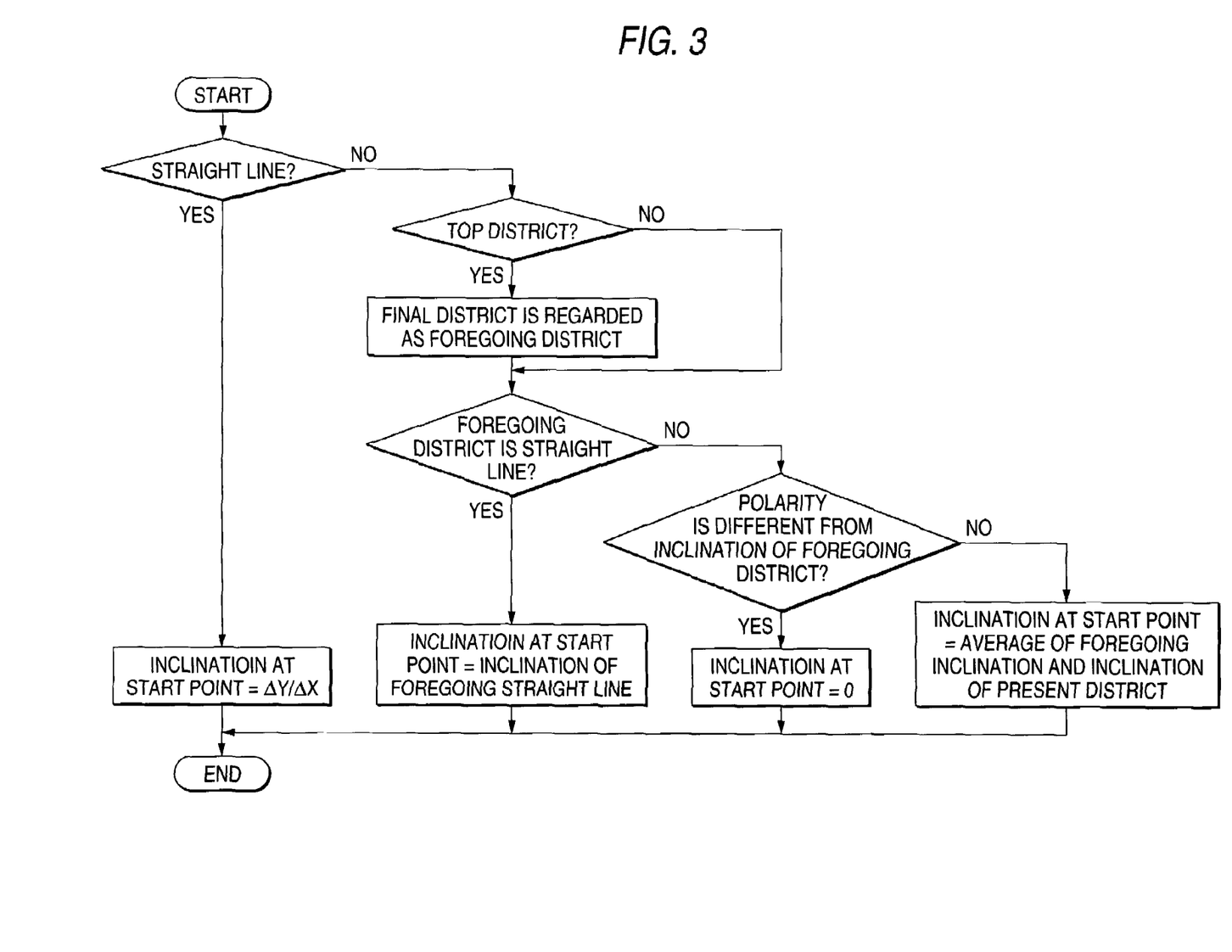
FIG. 3 is a flowchart showing a method for calculating the inclination at the start point.

First, a description is given of a method for obtaining the inclination at the start point with reference to FIG. 3.

In order that the synthesized final data becomes a smooth curve, it is necessary that the inclination at the start point of the foregoing and succeeding straight and curved lines is matched to the inclination at the end point. In cases of connection of a straight line and a curved line, the start district and the end district, the inclination at the start point is obtained by the following steps, with a case, in which the polarities of the inclinations differ from each other, taken into consideration:

(1) in a case where the present district is a straight line, the inclination ($\Delta y/\Delta x$) of the present district is made into an inclination at the start point;

(2) in a case where the present district is the top district, the final district is made into the foregoing district;

(3) in a case where the foregoing district is a straight line and the present district is a curved line, the inclination of a straight line of the foregoing district is made into an inclination at the start point;

(4) in a case where both the foregoing district and the present district are curved lines, and the polarities of the inclinations of the entire foregoing districts are different from that of the inclination of the entire present district, the inclination at the start point is regarded as zero; that is, the initial speed becomes zero, and (5) in a case where both the foregoing district and the present district are curved lines, and the polarities of the inclinations of the entire foregoing districts are the same as that of the inclination of the entire present district, the average of an inclination when the present district is linearly approximated and an inclination when the foregoing district is linearly approximated is made into the inclination at the start point.

Figure 4:
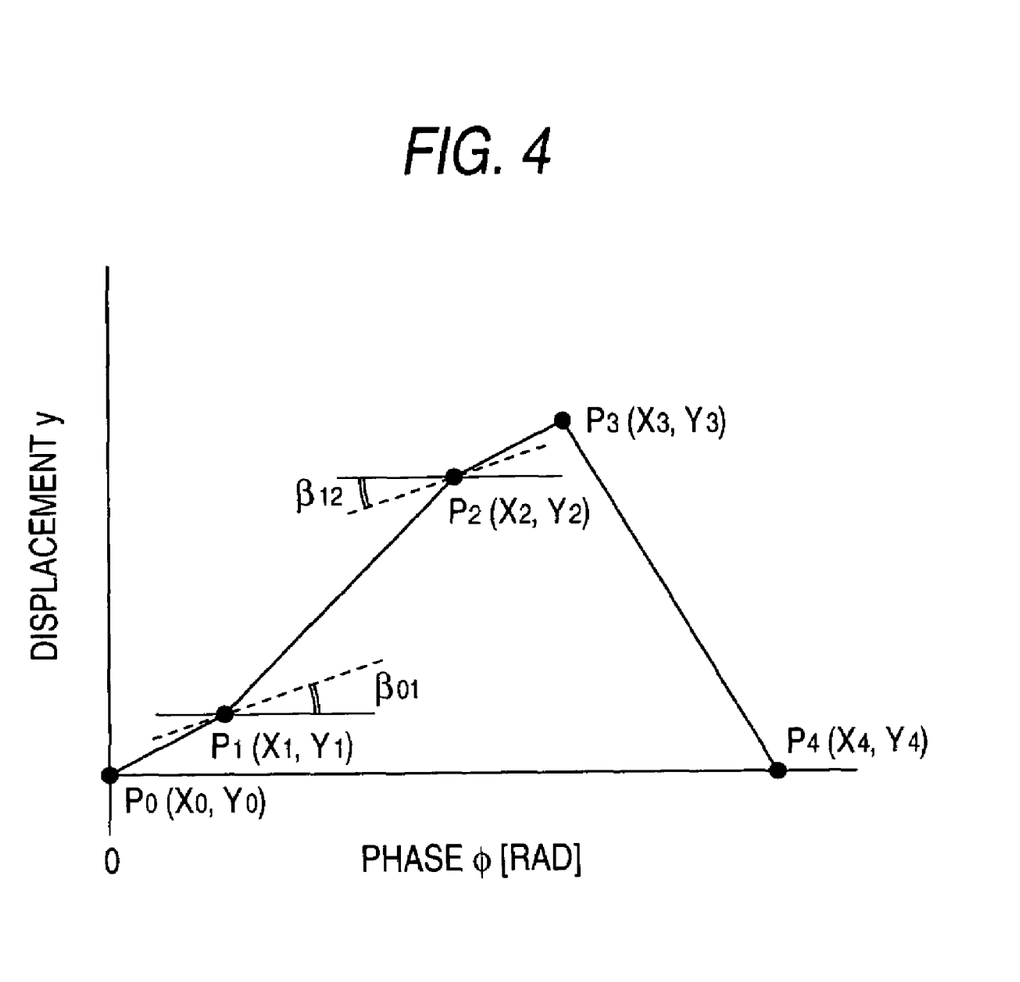
FIG. 4 is a view describing a detailed method of obtaining the inclination at the start point.

In such a case, a description is given of a detailed method for obtaining the inclination at the start point with reference to FIG. 4. It is assumed that, in FIG. 4, data of the designated points are $(X_0, Y_0)$, $(X_1, Y_1)$, $(X_2, Y_2)$, $(X_3, Y_3)$, $(X_4, Y_4)$, and the corresponding point is approximated by a straight line. It is assumed that lengths and inclinations of segments at this time are, respectively, $l_{01}$, $l_{12}$, $l_{23}$, $l_{34}$, and $k_{01}$, $k_{12}$, $k_{23}$, and $k_{34}$. At this time, the inclination at the start point is determined by Equation (5) based on the lengths and inclinations of the foregoing and succeeding segments at the designated point which becomes the start point.

> Inclination at the start point=(Inclination of the segment immediately before the designated point× Length of the segment immediately after the designated point)/(Length of the segment immediately before the designated point+Length of the segment immediately after the designated point)+Inclination of the segment immediately after the designated point×Length of the segment immediately before the designated point)/ (Length of the segment immediately before the designated point+Length of the segment immediately after the designated point) (5)

A description is given of an example in which the segment connecting $P_1$–$P_2$ is taken for instance. The inclination at the start point is obtained by the following equation (6) on the basis of lengths $I_{01}$, $I_{12}$ and inclinations $k_{01}$, $k_2$ of $P_0$–$P_1$ and $P_1$–$P_2$. At this time, $I_{01}$, $I_{12}$, $k_{01}$, and $k_{12}$ are expressed by the following equations (7) through (10).

$$\text{Inclination at the start point}=(k_{01}\times I_{12})/(I_{01}+I_{12})+(k_{12}\times I_{01})/(I_{01}+I_{12}) \quad (6)$$

$$I_{01}=((X_1-X_0)^2+(Y_1-Y_0)^2)^{1/2} \quad (7)$$

$$I_{12}=((X_2-X_1)^2+(Y_2-Y_1)^2)^{1/2} \quad (8)$$

$$k_{01}=((Y_1-Y_0)/(X_1-X_0)) \quad (9)$$

$$k_{12}=((Y_2-Y_1)/(X_2-X_1)) \quad (10)$$

Figure 5:
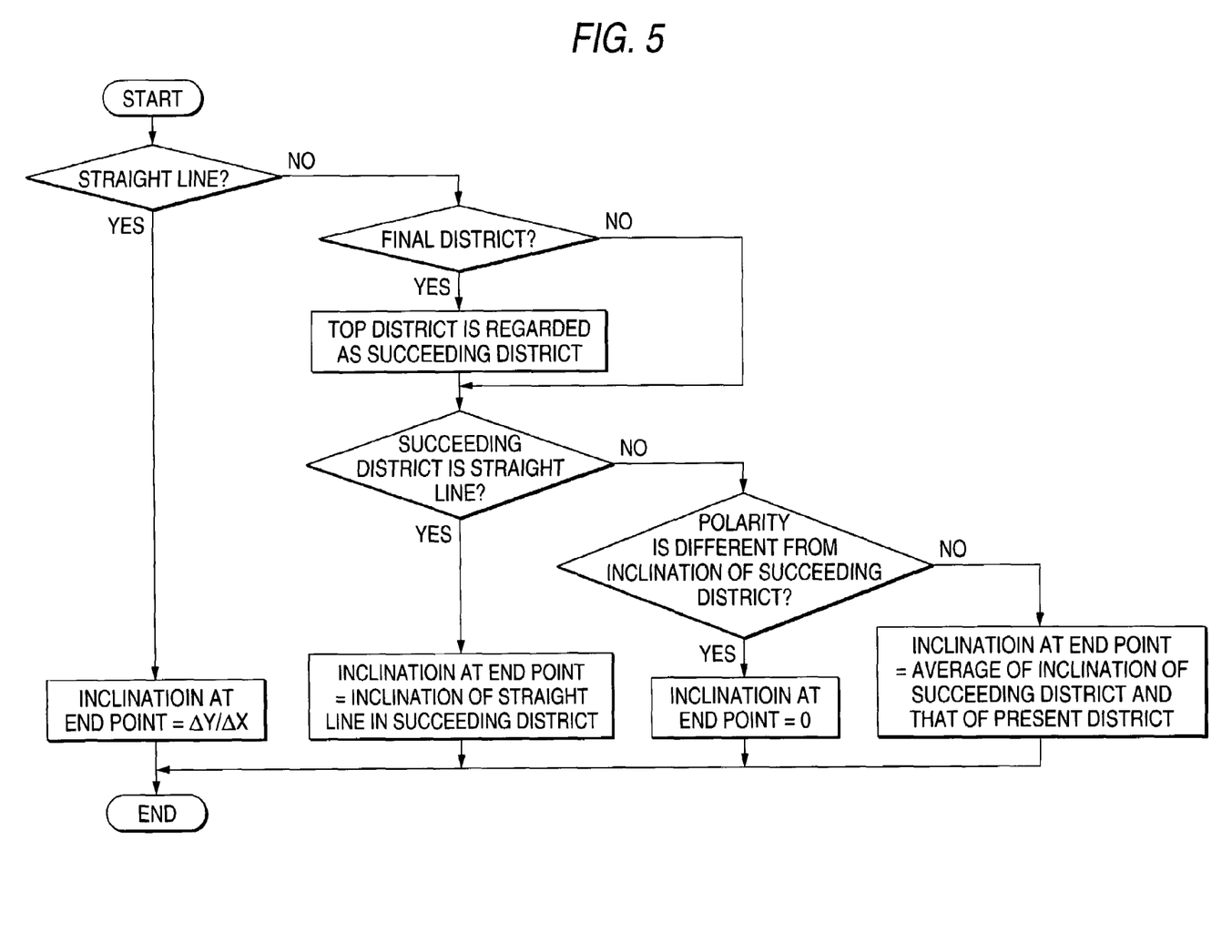
FIG. 5 is a flowchart showing a method for calculating the inclination at the end point.

Next, a description is given, as follows, of the steps for obtaining the inclination at the end point with reference to FIG. 5 as in the above.

(1) in a case where the present district is a straight line, the inclination ($\Delta y/\Delta x$) of the present district is made into an inclination at the end point;

(2) in a case where the present district is the final district, the top district is made into the succeeding district;

(3) in a case where the succeeding district is a straight line and the present district is a curved line, the inclination of a straight line of the succeeding district is made into an inclination at the end point;

(4) in a case where both the succeeding district and the present district are curved lines, and the polarities of the inclinations of the entire succeeding districts are different from that of the inclination of the entire present district, the inclination at the end point is regarded as zero. That is, the final speed becomes zero; and (5) in a case where both the succeeding district and the present district are curved lines, and the polarities of the inclinations of the entire succeeding districts are the same as that of the inclination of the entire present district, the average of an inclination when the present district is linearly approximated and an inclination when the succeeding district is linearly approximated is made into the inclination at the end point.

In such a case, by the method similar to that for having obtained the inclination at the start point, the inclination at the end point can be obtained by lengths $I_{12}$, $I_{23}$ and inclinations $k_{12}$, $k_{23}$ of $P_1$–$P_2$ and $P_2$–$P_3$ as well.

Next, a cam profile in the district 1 is produced by the above-described equations (1), (2), (3), and (4) using the obtained values of the inclinations at the start point and end point. Similarly, cam profiles in the respective districts are generated with respect to the districts 2, 3 and 4. Herein, by synthesizing the cam profiles in the entire districts, the entire cam profile can be obtained.

Figure 6:
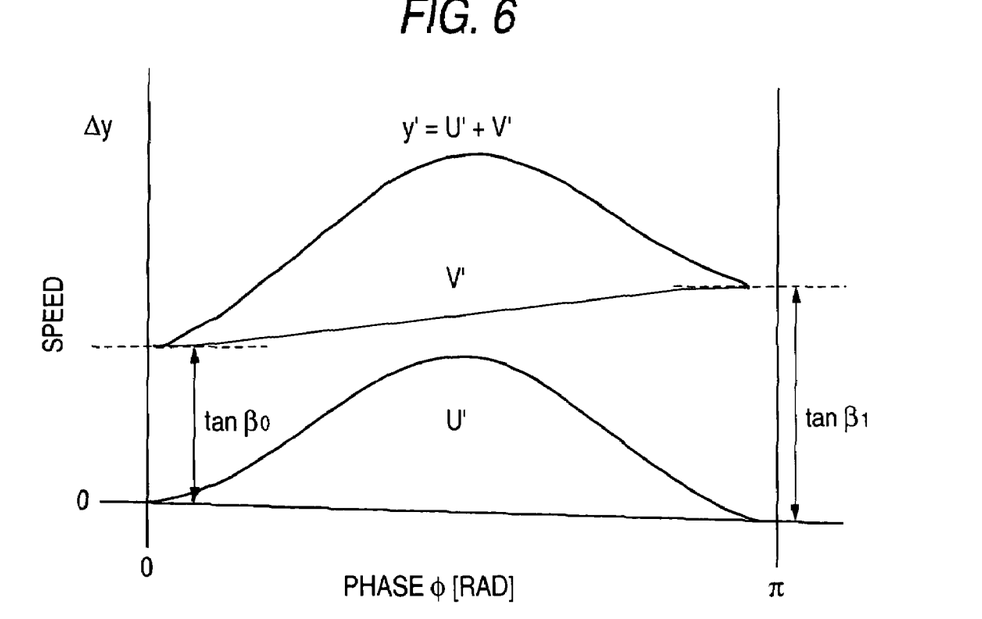
FIG. 6 is a view showing a method for generating a smooth speed curve.

Next, a description is given of how the equations (1) and (2) have been obtained, with reference to FIG. 6. FIG. 6 is a view showing a method for generating a smooth dimensionless value curve corresponding to speed.

Referring to FIG. 6, it is assumed that, in a plane coordinate whose abscissa indicates a dimensionless value corresponding to phase and ordinate indicates a dimensionless value y corresponding to displacement, the tangential angle at both ends of the start point and end point, which connect two optional points (X,Y), are, respectively, $\beta_0$ and $\beta_1$ [rad]. An equation to calculate a smooth cam profile that the acceleration becomes zero at two designated points is generated as shown below.

First, a dimensionless value curve y' corresponding to speed approximated by a SIN curve to obtain a smooth curve is led out.

In order to carry out curve approximation by (1−cosΦ), A is determined to be an indeterminate coefficient, wherein a dimensionless value component U' corresponding to speed in which the speeds at the start point and end point become zero is expressed by the following equation (11).

$$U'=A(1-\cos 2\Phi) \quad (11)$$

Since $\tan\beta_0$ and $\tan\beta_1$ respectively become a speed at the start point and that at the end point, a dimensionless value component V' corresponding to speed including the speed at the start point and that at the end point is expressed by the following equation (12).

$$V'=\tan\beta_0+1/2(\tan\beta_1-\tan\beta_0)(1-\cos\Phi) \quad (12)$$

The dimensionless value curve y' corresponding to speed becomes the sum of the dimensionless value component U' corresponding to speed and dimensionless value component V' corresponding to speed and is expressed by the following equation (13).

$$y'=A(1-\cos 2\Phi)+\tan\beta_0+1/2(\tan\beta_1-\tan\beta_0)(1-\cos\Phi) \quad (13)$$

The dimensionless value y corresponding to displacement is obtained by integrating the dimensionless value curve y' corresponding to speed and is expressed by the following equation (14).

$$Y=A(\Phi-1/2(\sin 2\Phi)+\tan\beta_0+1/2(\tan\beta_1-\tan\beta_0)(\Phi-\sin\Phi) \quad (14)$$

Herein, in order to obtain a coefficient A, two cases are taken into consideration, one of which is a case where Φ=0 is established in Equation (1) and the other of which is a case where Φ=π is established therein.

In the case of Φ=0, the dimensionless value y corresponding to displacement becomes zero.

In the case of Φ=π, Δy is expressed by the following equation (15).

$$\Delta y=\pi(A+\tan\beta_0+(\tan\beta_1-\tan\beta_0)/2) \quad (15)$$

By converting Equation (15) in the form of A=, the following equation (16) which is in the same form of Equation (2) can be obtained.

$$A=\Delta y/\pi-1/2(\tan\beta_1+\tan\beta_0) \quad (16)$$

As described above, in the generating method with a cam in the electronic cam device according to the embodiment, where a plurality of designated points are given, the inclination in the case where the optimum cam profiles at respective designated points are realized is first obtained for each of the respective designated points, and a cam profile for each of the districts where two designated points are made into the start point and end point is obtained by using the value of the inclination and Equations (1), (2), (3) and (4), wherein the entire cam profile is obtained by connecting the cam profiles acquired for each of the districts.

By doing so, in the electronic cam device according to the embodiment, by only designating a designated point, for which dimensionless value corresponding to displacement is regulated, on the plane coordinate (X,Y), it is possible to automatically generate a smooth cam curve that passes through all the designated point at an acceleration of 0.

Next, a detailed description is given of a method for automatically generated an actual cam profile by an electronic cam device according to the embodiment with reference to FIG. 7 through FIG. 11.

Figure 7:
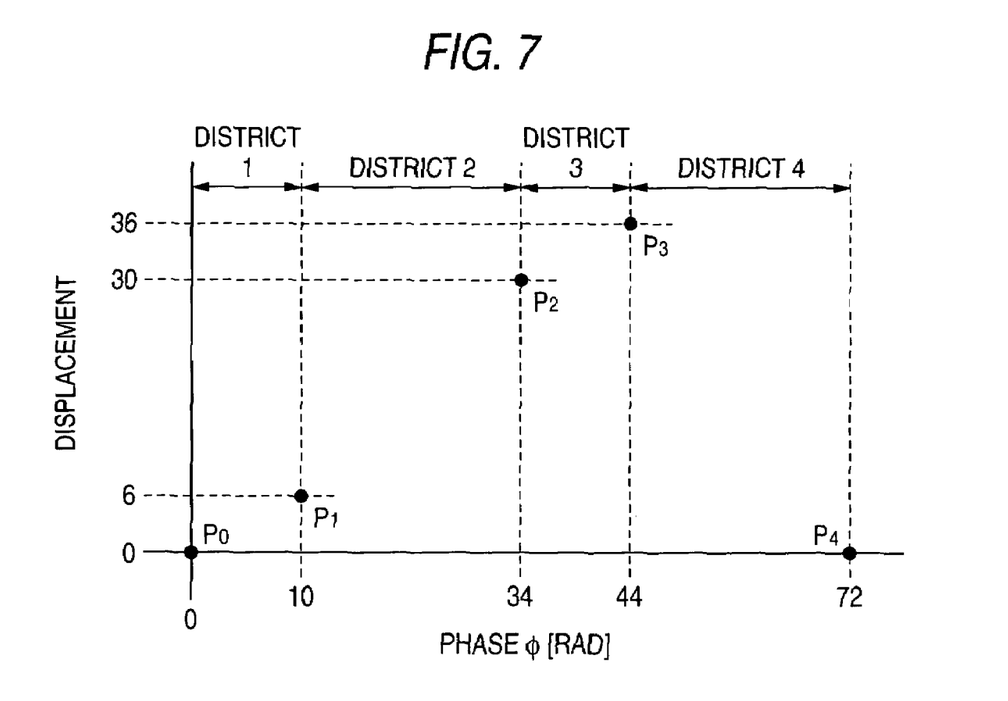
FIG. 7 is a view showing position data of a fixed-dimension cutting machine.
Figure 8:
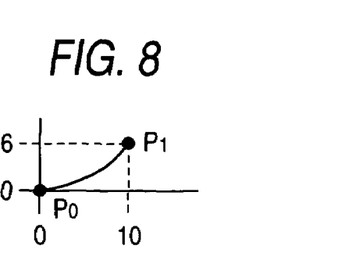
FIG. 8 is a view showing a cam profile, at district 1 in FIG. 7, which is generated in a cam device according to the present embodiment.
Figure 9:
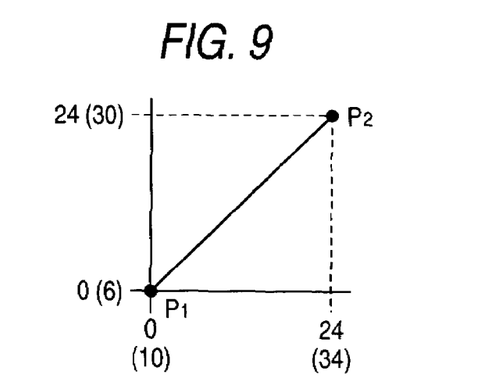
FIG. 9 is a view showing a cam profile, at district 2 in FIG. 7, which is generated in a cam device according to the present embodiment.
Figure 10:
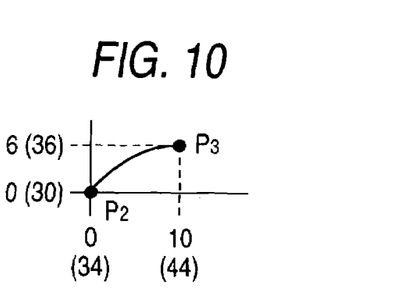
FIG. 10 is a view showing a cam profile, at district 3 in FIG. 7, which is generated in a cam device according to the present embodiment.
Figure 11:
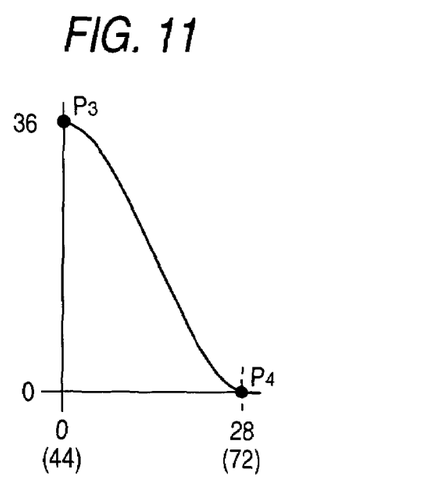
FIG. 11 is a view showing a cam profile, at district 4 in FIG. 7, which is generated in a cam device according to the present embodiment.

An example of position data of a fixed-dimension cutting machine used in the description is shown in FIG. 7. In the plane coordinate on which the abscissa indicates a dimensionless value corresponding to phase, and the ordinate indicates dimensionless value corresponding to displacement. Reference symbol $P_0$ denotes an operation start position, $P_1$ and $P_2$, respectively, denote a start point and an end point of a straight line area synchronized with products in order to cut off the respective products, $P_3$ denotes a stop position after products are cut off, and $P_4$ denotes a point returning to the start point. And it is assumed that districts of curves connecting the respective points are District 1 ($P_0$–$P_1$), District 2 ($P_1$–$P_2$), district 3 ($P_2$–$P_3$), and District 4 ($P_3$–$P_4$). Herein, the designated District $P_4$ becomes a designated District $P_0$ in the next cycle.

First, $\tan\beta_0$, $\tan\beta_1$ in respective districts and coefficient A are obtained as described below.

(1) District 1

Inclination at the start point=0 (zero is determined since the polarity of District 1 is different from the inclination of the entire District 4.

Inclination at the end point=1 (since the inclination of a straight line in District 2 is 24/24=1)

$\Delta x=10$ $\Delta y=6$ $\Phi = x\ \text{input} \times \pi/\Delta x = x\ \text{input} \times \pi/10$ $\tan\beta_0 = \text{Inclination at the start point} \times \Delta x/\pi = 0 \times 10/\pi = 0$ $\tan\beta_1 = \text{Inclination at the end point} \times \Delta x/\pi = 1 \times 10/\pi = 10/\pi$ $A = \Delta y/\pi - 1/2(\tan\beta_1 + \tan\beta_0) = 6/\pi - 1/2(10/\pi) = 1/\pi$ (2) District 2

Inclination at the start point=1 ($\Delta y/\Delta x$ since being a straight line)

Inclination at the end point ($\Delta y/\Delta x$ since being a straight line)

$\Delta x=24$ $\Delta y=24$ $\Phi = x\ \text{input} \times \pi/\Delta x = x\ \text{input} \times \pi/24$ $\tan\beta_0 = \text{Inclination at the start point} \times \Delta x/\pi = 1 \times 24/\pi = 24/\pi$ $\tan\beta_1 = \text{Inclination at the end point} \times \Delta x/\pi = 1 \times 24/\pi = 24/\pi$ $A = \Delta y/\pi - 1/2(\tan\beta_1 + \tan\beta_0) = 24/\pi - 1/2(24/\pi + 24/\pi) = 0$ (3) District 3

Inclination at the start point=1 (Since the inclination of a straight line in District 2 is 24/24=1)

Inclination at the end point=0 (Zero is determined since the polarity is different from the inclination of the entire District 4).

$\Delta x=10$ $\Delta y=6$ $\Phi = x\ \text{input} \times \pi/\Delta x = x\ \text{input} \times \pi/10$ $\tan\beta_0 = \text{Inclination at the start point} \times \Delta x/\pi = 1 \times 10/\pi = 10/\pi$ $\tan\beta_1 = \text{Inclination at the end point} \times \Delta x/\pi = 0 \times 10/\pi = 0$ $A = \Delta y/\pi - 1/2(\tan\beta_1 + \tan\beta_0) = 6/\pi - 1/2(10/\pi) = 1/\pi$ (4) District 4

Inclination at the start point=0 (Zero is determined because the polarity is different from the inclination of the entire District 3)

Inclination at the end point=0 (Zero is determined because the polarity is different from the inclination of the entire District 1)

$\Delta x=28$ $\Delta y=-36$ $\Phi = x\ \text{input} \times \pi/\Delta x = x\ \text{input} \times \pi/28$ $\tan\beta_0 = \text{Inclination at the start point} \times \Delta x/\pi = 0 \times 28/\pi = 0$ $\tan\beta_1 = \text{Inclination at the end point} \times \Delta x/\pi = 0 \times 28/\pi = 0$ $A = \Delta y/\pi - 1/2(\tan\beta_1 + \tan\beta_0) = -36/\pi$ And, cam profiles in Districts 1, 2, 3 and 4 are, respectively, generated as shown in FIGS. 8, 9, 10 and 11, by using the values of $\tan\beta_0$ and $\tan\beta_1$ and value of the coefficient A, which are obtained by the above-described calculations, and using Equation (1).

Figure 12:
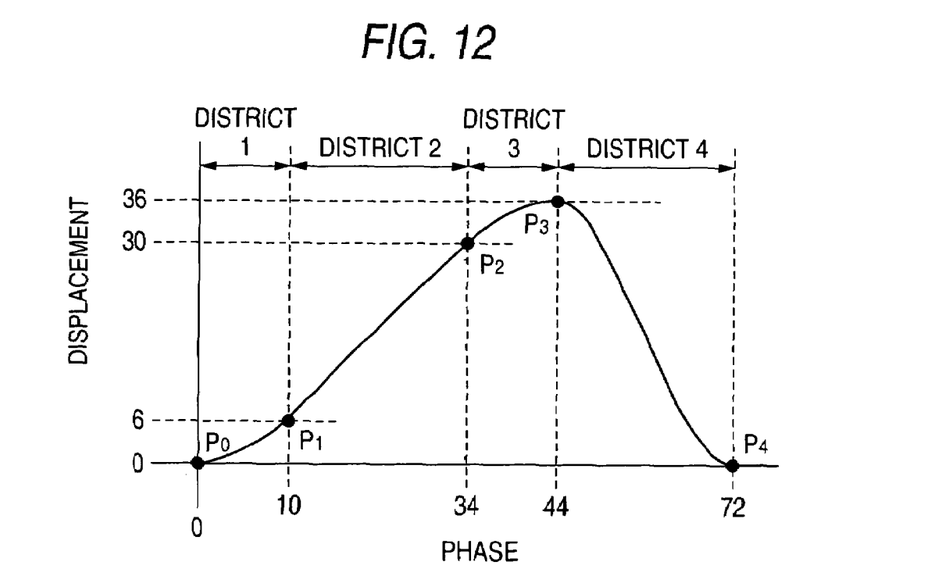
FIG. 12 is a view showing the entire cam profile obtained by connecting cam curves at the respective districts in FIG. 8 through FIG. 11.

Finally, it is possible to obtain FIG. 12, which shows the entire cam profile, by synthesizing the cam profiles in the respective Districts 1, 2, 3 and 4 obtained.

Figure 13:
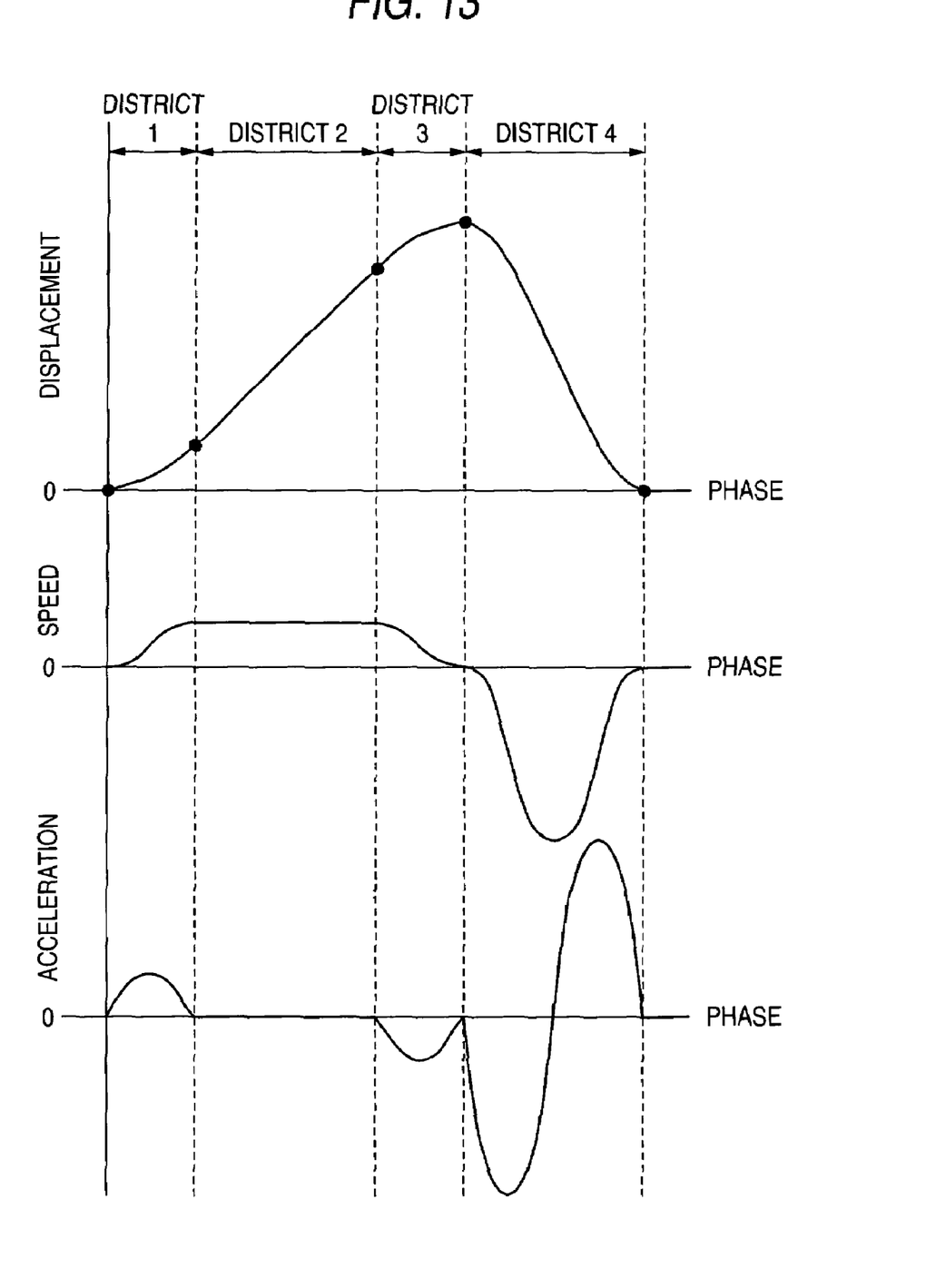
FIG. 13 is a view showing data of displacement, speed and acceleration where the machine is operated with the cam profile obtained in FIG. 12.

FIG. 13 shows displacement, speed and acceleration data in the case where the fixed-dimension cutting machine being an object to be controlled, is operated by the cam profile obtained in FIG. 12. Referring to FIG. 13, in the cam profile obtained by the electronic cam device according to the present embodiment, it is found that the cam profile passed through the respective designated points with smooth curves, and the accelerations at the respective points become zero. Therefore, in the object to be controlled by such a cam profile, there is no case where any shock is applied to the machine.

As described above, according to the invention, such effects can be brought about, by which it is possible for even unskilled persons to simply prepare cam data that do not apply any shock to a machine, without acquiring a cam technique of a mechanical cam mechanism, and the designing time thereof can be shortened to a large extent.

What is claimed is:

1. A method for generating cam data in an electronic cam device which controls the electronic cam device for electrically realizing cam actions by driving an object to be driven, on the basis of preset cam data, comprising the steps of:

inputting coordinate values composed of dimensionless values corresponding to phases of a plurality of designated points and dimensionless values corresponding to displacement thereof;

calculating inclinations of the start and end points of a cam profile of a district for which two designated points adjacent to each other of a plurality of given designated points are made into the start and end points;

obtaining values of $\tan\beta_0$ and $\tan\beta_1$ by an equation which is expressed by the above calculated inclinations of the start and end points, $\Delta x$ which is a difference between dimensionless values each corresponding to displacements of the start and end points, and $\tan\beta_0$=Inclination at the start point$\times\Delta x/\pi$ $\tan\beta_1$=Inclination at the end point$\times\Delta x/\pi$ calculating a cam profile in the corresponding district by obtaining a dimensionless value y corresponding to displacement with respect to the dimensionless value $\Phi$ corresponding to phase using an equation which is expressed by said $\tan\beta_0$, $\tan\beta_1$, and $\Delta y$ which is a difference between displacement at the start point and that at the end point, and $y = A(\Phi - 1/2\sin 2\Phi) + \Phi\tan\beta_0 + 1/2(\tan\beta_1 - \tan\beta_0)(\Phi - \sin\Phi)$ wherein coefficient A is defined as $A = \Delta y/\pi - 1/2(\tan\beta_1 - \tan\beta_0)$; and generating the entire cam curve by calculating and synthesizing a cam profile existing between the two corresponding points with respect to all districts.

2. The method for generating cam data in an electronic cam device as set forth in claim 1, wherein said step of calculating the inclination at the start point and end point of a cam profile of a district for which two designated points adjacent to each other of said plurality of given designated points are made into the start and end points may calculate the inclination at said start point in compliance with the following steps:

(a) in a case where the present district is a straight line, the inclination ($\Delta y/\Delta x$) of the present district is made into an inclination at the start point, thereby finishing the calculation of the inclination;

(b) in a case where the present district is the top district, the final district is made into the foregoing district;

(c) in a case where the forgoing district is a straight line, the inclination of a straight line of the foregoing district is made into an inclination at the start point, thereby finishing the calculation of the inclination;

(d) in a case where the polarities of the inclination at the entire foregoing districts are different from that of the inclination at the entire present district, the inclination at the start point is regarded as zero, thereby finishing the calculation of the inclination; and (e) the average of an inclination when the present district is linearly approximated and an inclination when the foregoing district is linearly approximated is made into the inclination at the start point; and said step may calculate an inclination at said end point in compliance with the following steps:

(A) in a case where the present district is a straight line, the inclination ($\Delta y/\Delta x$) of the present district is made into an inclination at the end point, thereby finishing the calculation of the inclination;

(B) in a case where the present district is the final district, the top district is made into the succeeding district;

(C) in a case where the succeeding district is a straight line, the inclination of a straight line of the succeeding district is made into an inclination at the end point, thereby finishing the calculation of the inclination;

(D) in a case where the polarities of the inclinations of the entire succeeding districts are different from that of the inclination of the entire present district, the inclination at the end point is regarded as zero, thereby finishing the calculation of the inclination; and (E) the average of an inclination when the present district is linearly approximated and an inclination when the succeeding district is linearly approximated is made into the inclination at the end point.

3. An electronic cam device for electrically realizing cam actions by driving an object to be driven, on the basis of preset cam data, wherein coordinate values composed dimensionless values corresponding to phases of a plurality of designated points and dimensionless values corresponding to displacement thereof are inputted;

inclinations of the start and end points of a cam profile corresponding to a district between two designated points adjacent to each other of a plurality of given designated points are calculated;

values of $\tan\beta_0$ and $\tan\beta_1$ are obtained based on an equation which is expressed by the above calculated inclinations of the start and end points, $\Delta x$ which is a difference in phase between the start and end points, and $\tan\beta_0$=Inclination at the start point$\times\Delta x/\pi$ $\tan\beta_1$=Inclination at the end point$\times\Delta x/\pi$;

a cam profile in the corresponding district is calculated by obtaining a dimensionless value y corresponding to displacement with respect to the dimensionless value $\Phi$ corresponding to phase using an equation which is expressed by the above-described $\tan\beta_0$, $\tan\beta_1$, and $\Delta y$ which is a difference between dimensionless values each corresponding to displacement at the start point and that at the end point, and $y = A(\Phi - 1/2\sin 2\Phi) + \Phi\tan\beta 0 + 1/2(\tan\beta 1 - \tan\beta 0)(\Phi - \sin\Phi)$ wherein the coefficient A is defined as $A = \Delta y/\pi - 1/2(\tan\beta 1 - \tan\beta 0)$; and the entire cam profile is generated by calculating and synthesizing a cam profile existing between the two corresponding points with respect to all the districts.

4. The electronic cam device as set forth in claim 3, wherein said means for automatically generating set values calculates the inclination at said start point in compliance with the following steps:

(a) in a case where the present district is a straight line, the inclination ($\Delta y/\Delta x$) of the present district is made into an inclination at the start point, thereby finishing the calculation of the inclination;

(b) in a case where the present district is the top district, the final district is made into the foregoing district;

(c) in a case where the foregoing district is a straight line, the inclination of a straight line of the foregoing district is made into an inclination at the start point, thereby finishing the calculation of the inclination;

(d) in a case where the polarities of the inclinations of the entire foregoing districts are different from that of the inclination of the entire present district, the inclination at the start point is regarded as zero, thereby finishing the calculation of the inclination; and (e) the average of an inclination when the present district is linearly approximated and an inclination when the foregoing district is linearly approximated is made into the inclination at the start point; and calculates the inclination at said end point in compliance with the following steps:
(A) in a case where the present district is a straight line, the inclination ($\Delta y/\Delta x$) of the present district is made into an inclination at the end point, thereby finishing the calculation of the inclination;
(B) in a case where the present district is the final district, the top district is made into the succeeding district;
(C) in a case where the succeeding district is a straight line, the inclination of a straight line of the succeeding district is made into an inclination at the end point, thereby finishing the calculation of the inclination;
(D) in a case where the polarities of the inclinations of the entire succeeding districts are different from that of the inclination of the entire present district, the inclination at the end point is regarded as zero, thereby finishing the calculation of the inclination; and
(E) the average of an inclination when the present district is linearly approximated and an inclination when the succeeding district is linearly approximated is made into the inclination at the end point.

* * * * *